United States Patent
Lee et al.

(10) Patent No.: US 7,388,808 B2
(45) Date of Patent: Jun. 17, 2008

(54) METHOD FOR DEPTH MIGRATING SEISMIC DATA USING PRE-STACK TIME MIGRATION, DEMIGRATION, AND POST-STACK DEPTH MIGRATION

(75) Inventors: Shu-Schung Lee, Houston, TX (US); John Willis, Houston, TX (US); Yeashung Lin, Sugar Land, TX (US)

(73) Assignee: PGS Americas, Inc., Houston, TX (US)

( * ) Notice: Subject to any disclaimer, the term of this patent is extended or adjusted under 35 U.S.C. 154(b) by 107 days.

(21) Appl. No.: 10/947,745

(22) Filed: Sep. 23, 2004

(65) Prior Publication Data

US 2006/0062083 A1    Mar. 23, 2006

(51) Int. Cl.
*G01V 1/36*    (2006.01)

(52) U.S. Cl. .................... 367/50; 367/51; 367/52; 367/53; 367/73

(58) Field of Classification Search ............ 367/50–53, 367/73
See application file for complete search history.

(56) References Cited

U.S. PATENT DOCUMENTS

| | | | | |
|---|---|---|---|---|
| 4,964,098 A | * | 10/1990 | Hornbostel | 367/73 |
| 5,243,563 A | * | 9/1993 | Kim | 367/50 |
| 5,544,126 A | * | 8/1996 | Berryhill | 367/52 |
| 5,808,964 A | * | 9/1998 | Lailly et al. | 367/53 |
| 6,016,461 A | * | 1/2000 | Thore | 702/6 |
| 6,507,787 B1 | * | 1/2003 | Filpo Ferreira Da Silva et al. | 702/1 |
| 6,577,955 B2 | * | 6/2003 | Guillaume | 702/14 |
| 6,691,075 B1 | * | 2/2004 | Winbow et al. | 703/2 |
| 6,868,039 B2 | * | 3/2005 | Broto | 367/73 |
| 2002/0116160 A1 | * | 8/2002 | Lailly et al. | 703/5 |
| 2003/0208321 A1 | * | 11/2003 | Martinez et al. | 702/14 |
| 2005/0088914 A1 | * | 4/2005 | Ren et al. | 367/52 |

OTHER PUBLICATIONS

Hubral, et al. "A unified approach to 3-D seismic reflection imaging, Par 1: Basic concepts." Geophysics, vol. 61, No. 3 (May-Jun. 1996).*
Jurado, et al. "Fast 3D two-point raytracing for traveltime tomography." KIM Research Consotrium. Jul. 2, 1998.*
Lee, et al. "Efficient true-amplitude weights in Kirchoff time migration." SEG 2004.*
Zhang, et al. "Reverse time migration in tilted transverseley isotropic media." Lawrence Berkeley National Laboratory. 2004.*
Douma, et al. "Closed-form expressions for map-time migration in VTI media and the applicability of map depth-migration in the presence of caustics." Center for Wave Phenomena, Colorado School of Mines, Dec. 10, 2003.*

(Continued)

*Primary Examiner*—Jack Keith
*Assistant Examiner*—Scott A Hughes
(74) *Attorney, Agent, or Firm*—F. Eugene Thigpen; Richard A. Fagin

(57) ABSTRACT

A method is disclosed for depth migrating seismic data. The method includes pre-stack time migrating the seismic data to form a stacked, time migrated image. The stacked, time migrated image is demigrated, and post-stack depth migration is then performed on the demigrated image. In some embodiments, the pre-stack time migration and the demigration account for ray bending in vertically transversely isotropic media.

2 Claims, 3 Drawing Sheets

OTHER PUBLICATIONS

Sun, et al. "Amplitude Preserving V(z) pre-stack Kirchhoff time migration for VTI media." First Break, vol. 19.11 Nov. 2001.*

Sun, et al. "Optimized 6th order NMO correction for long-offset seismic data." SEG Int'l Exposition and 72nd Annual Meeting, Oct. 2002.*

Wang, et al. "Seismic amplitude inversion for interface geometry of multi-layered structures." Pure and Applied Geophysics 157 (2000).*

Chuanwen Sun, Ruben D. Martinez, "Amplitude preserving 3D pre-stack Krichhoff time migration for V(z) and VTI media", 72nd Annual International Meeting, Society of Exploration Geophysicists, Expanded Abstracts, 2002, pp. 1224-1227.

Tariq Alkhalifah, "Velocity analysis using nonhyperbolic moveout in transversely isotropic media", Geophysics, 1997, pp. 1839-1859, vol. 62, No. 6.

Yu Zhang, Matthew Karazincir, Carl Notfors, James Sun, Barry Hung, "Amplitude Preserving v(z) Prestack Kirchhoff Migration, Demigration and Modeling", EAGE 64th Conference & Technical Exhibition, May 27-30, 2002, Florence, Italy.

* cited by examiner

SURFACE POSITION

SURFACE POSITION

METHOD FOR DEPTH MIGRATING SEISMIC DATA USING PRE-STACK TIME MIGRATION, DEMIGRATION, AND POST-STACK DEPTH MIGRATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data processing. More particularly, the invention relates to methods for demigrating previously time-migrated seismic data so that post-stack depth migration processes can be used.

2. Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the earth's surface, and deploying a seismic energy source near the sensors also at or near the surface. The seismic energy source is actuated and seismic energy emanates from the source, traveling generally downwardly through the subsurface until it reaches one or more acoustic impedance boundaries in the subsurface. Seismic waves are reflected from the one or more impedance boundaries, whereupon it then travels upwardly until being detected by one or more of the seismic sensors. Structure and stratigraphic composition of the Earth's subsurface is inferred from, among other properties of the detected energy, the travel time of the seismic wave, and the amplitude and phase of the various frequency components of the seismic wave with respect to the energy emanating from the seismic source.

In order to infer the structures of subsurface earth formations from seismic waves measured at the earth's surface from the source/receiver position at the surface, it is necessary to determine the velocity of the various formations through which the seismic wave passes. Velocities of the earth formations can vary both with respect to depth in the earth (vertically), and with respect to geographic position (laterally). Seismic data, however, are recorded only with respect to time. Methods known in the art for estimating velocities of the earth formations both vertically and laterally rely on inferences about the travel path geometry of the seismic wave as it travels from the source to the various receivers deployed at the earth's surface.

In order for images produced from seismic data to correspond accurately to the spatial distribution of subsurface structures and compositional changes in the Earth's subsurface, techniques known generally as "time migration" and "depth migration" are performed on the seismic data. Migration is a process by which reflection events in seismic data are made to correspond in time (time migration) to the reflection times that would occur if seismic data acquisition geometry were identical for every surface position for which an image is produced, and in the case of depth migration, to have such events be located at the depths in the Earth at which they are located. Thus, migration is performed in two general classes of migration process. Time migration is used to cause the reflective events to be poisoned at the correct time in the image. Depth migration is used to cause the reflective events to be positioned at the correct depth in the image. Migration techniques are performed either "pre-stack" or "post-stack." Post stack migration refers to migration techniques that are performed on seismic data for which numbers of individual data recordings ("traces") are processed and summed to improve seismic signal to noise ratio. Pre-stack migration, by contrast, is performed on individual data recordings. Pre-stack migration typically produces better images. An effective method of pre-stack time migration is disclosed, for example, in Sun, C., Martinez, R., *Amplitude preserving 3D pre-stack Kirchhoff time migration for V(z) and VTI media*, $72^{nd}$ Annual International Meeting, Society of Exploration Geophysicists, Expanded Abstracts, pp. 1224-1227 (2002).

Pre-stack depth migration typically produces the best image images comparing to the other type of migration. Pre-stack depth migration, however, is computationally intensive, and therefore relatively expensive, as compared with post-stack depth migration techniques. Pre-stack time migration techniques, such as the technique disclosed in the Sun et al. paper referred to above, are relatively computationally economical. What is needed is a technique to produce a stacked seismic section having the image quality of pre-stack depth migration while incurring pre-stack time migration computation cost.

SUMMARY OF THE INVENTION

One aspect of the invention is a method for depth migrating seismic data. The method includes pre-stack time migrating the seismic data to form a stacked, time migrated image. The stacked, time migrated image is demigrated, and post-stack depth migration is then performed on the demigrated image. In some embodiments, the pre-stack time migration and the demigration account for ray bending and vertical transverse isotropic media.

Another aspect of the invention is a computer program stored in a computer-readable medium. The program includes logic operable to cause a programmable computer to perform depth migration of seismic data. The depth migration includes pre-stack time migrating the seismic data to form a stacked, time migrated image. The stacked, time migrated image is demigrated, and post-stack depth migration is then performed on the demigrated image. In some embodiments, the pre-stack time migration and the demigration account for ray bending and vertical transverse isotropic media.

Other aspects and advantages of the invention will be apparent from the following description and the appended claims.

DETAILED DESCRIPTION

Figure 1:
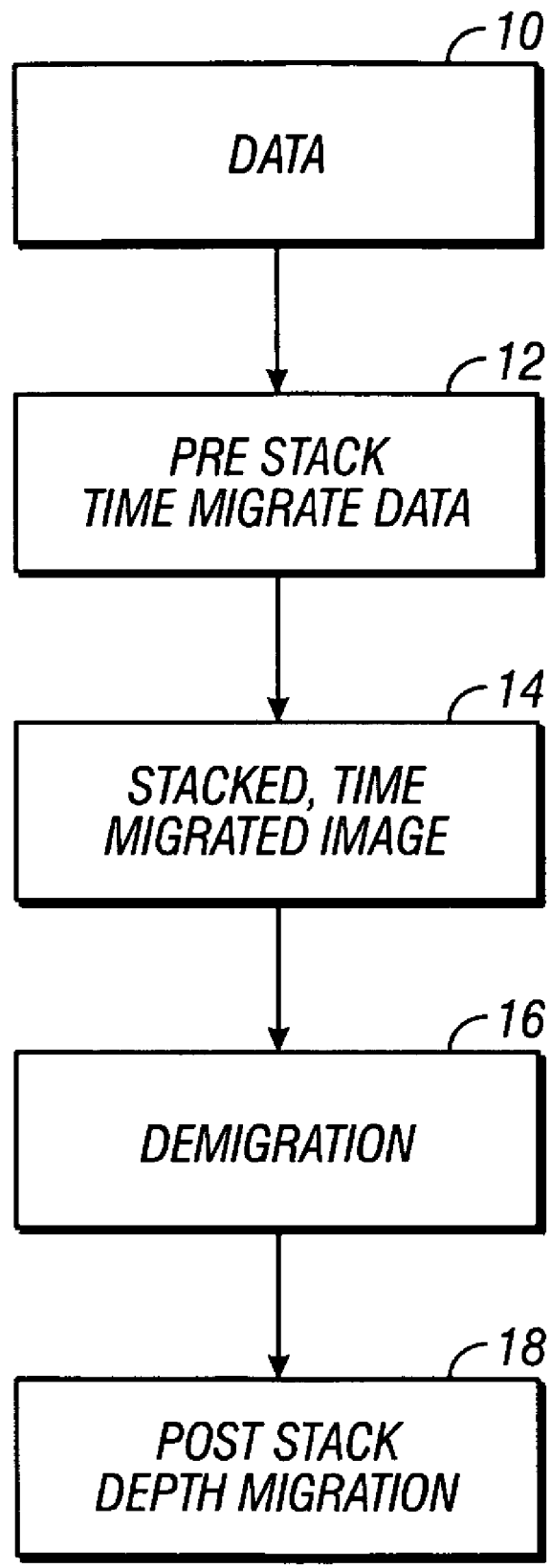
FIG. 1 shows a flow chart of one embodiment of a method according to the invention.

Generally, methods according to the invention use a combination of pre-stack time migration and velocity analysis, iteratively to obtain a model of velocities of layers within the Earth's subsurface, and substantially correct two way travel times to various reflectors within the Earth's subsurface. A volume of seismic data is pre-stack time migrated. The stacked, time-based image produced from the pre-stack time migration is then demigrated. The demigrated image data are then used as input for a subsequent post-stack depth migration process. All the migration and demigration processes can use the same formation velocity model.

The first part of a method according to the invention, pre-stack time migration, can be explained as follows. Seismic wave can be thought of as traveling along a ray path from a seismic source at or near the Earth's surface, to a reflection point or "image point" in the Earth's subsurface, back to a seismic receiver at or near the Earth's surface. The total travel time of the seismic waves from the from source location, to image point, and then to the seismic receiver is known as the "two-way travel time." For the case where the source and the receiver are located at same geographic position, the two-way travel time T for seismic waves traveling along "bending" ray paths, in isotropic media with vertically varying velocity, also referred to as V(z) media, can be determined by the expression:

$$T = 2T_{g0}\left(1 + \frac{1}{2}CC\frac{c_4 x^6}{T_{g0}^2}\right) \tag{1}$$

where x is the distance along the Earth's surface ("surface distance") between the seismic energy source location and the image location, CC is a constant. $T_{g0}$ is the one-way travel time containing up to fourth order term of x. $T_{g0}$, can be determined by the following expression:

$$T_{g0} = \sqrt{(c_1 + c_2 x^2 + c_3 x^4)} \tag{2}$$

For "bending ray" travel times where there are large aperture-to-depth ratios in vertically transversely isotropic (VTI) media, travel time differentials resulting from the VTI media can be taken into account for time migration without the need for "ray tracing." The difference between travel times in isotropic and in VTI media can be calculated using the following expression:

$$\Delta T(VTI) = 2\sqrt{T_0^2 + \frac{x^2}{V_{rms}^2}} - 2\sqrt{T_0^2 + \frac{x^2}{V_{rms}^2} - C(VTI)x^4} \tag{3}$$

where C(VTI) can be calculated according to the expression:

$$C(VTI) = \frac{2\eta}{V_{rms}^2 [T_0^2 V_{rms}^2 + (1 + 2\eta)x^2]} \tag{4}$$

In the foregoing equations, $V_{rms}$ represents the root mean square (RMS) velocity of the subsurface formations, $T_0$ represents the vertical two-way travel time, and $\eta$ represents an anisotropy parameter. See, for example, Alkhalifah, T., *Velocity analysis using nonhyperbolic moveout in transversely isotropic media*, Geophysics, 62, 839-1854 (1997).

In general, because the change in travel-time in VTI media is small compared to the equivalent "straight ray" travel-time (the travel time that would occur if the seismic energy traveled along straight paths from source to image point to receiver), an approximation for ΔT(VTI) can be made by simplifying equations (3) and (4) to the following:

$$\Delta T(VTI) = \frac{C(VTI)x^4}{\sqrt{T_0^2 + \frac{x^2}{V_{rms}^2}}} \tag{5}$$

Equation (5) describes the travel time differential between a bending ray in isotropic media and in VTI media. Using the differential from equation (5), the travel time T for a bending ray in VTI media can be calculated by the expression:

$$T = 2T_{g0} + \Delta T = 2T_{g0}\left(1 + \frac{1}{2}CC\frac{c_4 x^6}{T_{g0}^2}\right) + \Delta T(VTI) \tag{6}$$

Equation (6) can be used to perform time migration in VTI media. Performing the process embodied in equation (6) on a plurality of seismic traces, each representing a different source and receiver position during acquisition, and then stacking the migrated traces results in a stacked, time-migrated image section.

Equation (6) can then be modified and implemented to compute demigration travel times for bending rays in VTI media. Equation (6) thus implemented takes both ray bending and VTI effects into account for seismic data acquired using large aperture-to-depth ratios (large lateral separation between the source and receiver positions and relatively shallow depth in the Earth) and is applicable to a zero offset demigration. Alternatively, equation (1) can be implemented to calculate demigration travel times in isotropic media. In demigration, recovery of reflection coefficients is performed by removing a geometrical spreading factor for primary reflections used in the migration process to preserve seismic signal amplitudes. Based on a demigration weight function as described in Zhang, Y., Karazincir, M., Notfors, C., Sun, J., Hung, B., 2002, *Amplitude Preserving v(z) Prestack Kirchhoff Migration, Demigration and Modeling*, 64th Conference EAGE, Expanded Abstracts, a zero-offset weight function can be simplified to the expression:

$$W = \frac{2V_0}{\cos\alpha_0 \psi \sigma} \tag{7}$$

where $\psi$ and $\sigma$ represent in-plane and out-of-plane geometric spreading terms, $\alpha_0$ represents the takeoff and emergence angle of the seismic waves and $V_0$ is the seismic velocity of the first layer of the subsurface. Assuming the formation layer velocities are substantially constant laterally in the vicinity of the source and receivers, (i.e. ignoring any lateral velocity gradients) then for a horizontal layer the weights W for bending rays can be approximated by the expression:

$$W \approx \frac{8V_0}{V_{rms}^4 T^2} \tag{8}$$

where $V_0$ again represents the velocity of the first layer, T is the input migrated two-way travel time to the image point, and $V_{rms}$ is the RMS velocity of the subsurface formations.

Kirchhoff time demigration of a time-migrated image may be expressed as:

$$I(T, x, y) = \int W(x, y, T, x_s, y_s, x_r, y_r) D(x_s, y_s, x_r, y_r, t_s + t_r) dx_s dy_s dx_r dy_r \quad (9)$$

where $I(T, x, y)$ is the demigrated image with respect to two way travel time and surface position, T is the image output (two way) time, W is the weighting function (such as can be calculated using equation (8) above), and D is the time derivative of the input seismic data. Substituting equation (1) for the travel time in isotropic media or substituting equation (6) for the travel time in VTI media, using equation (8) for the weight function, and then using such substitutions into equation (9), enables post-stack Kirchhoff time demigration in either V(z) (isotropic) or VTI media, depending on which travel time equation is substituted. The demigrated image or image section can then be used as input for post-stack depth migration techniques known in the art. "Image section" refers to a plurality of images each representing a different, yet geographically proximate, equivalent surface position.

In an example embodiment of a method according to this aspect of the invention, and referring to FIG. 1, seismic data 10 can be used as input to a pre-stack time migration process 12. One example of a pre-stack time migration process is disclosed in the Sun and Martinez paper referred to above. The result of pre-stack time migration is a stacked, time migrated image or image section, as shown at 14. The time migrated, stacked image or image section is then demigrated 16, as explained above, and using a formula such as equation (9). The demigrated image or image section is then used as input to a post-stack depth migration process, at 18.

Figure 2:
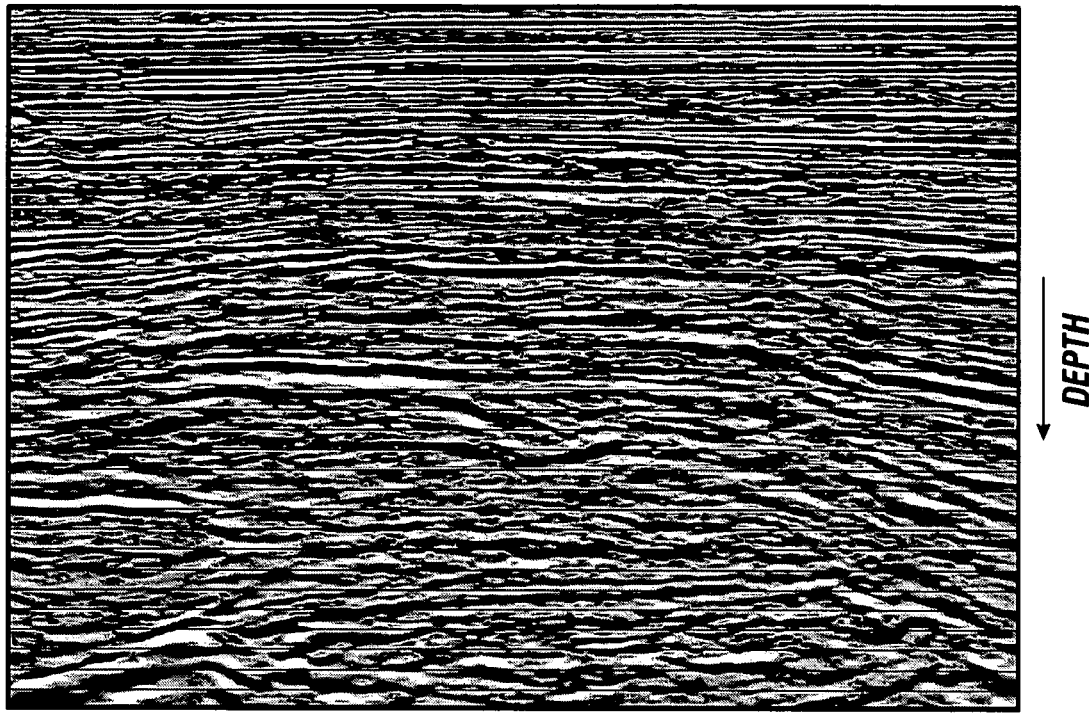
FIG. 2 shows a seismic section processed using pre-stack depth migration techniques known in the art.
Figure 3:
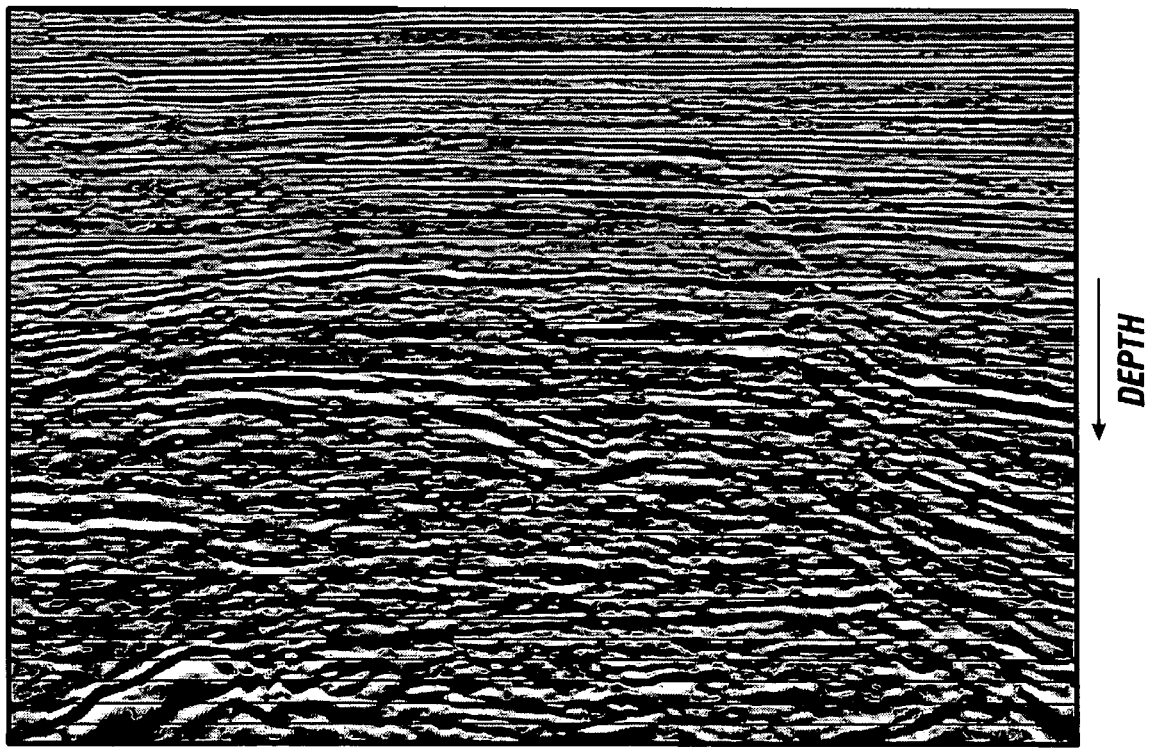
FIG. 3 shows a seismic record section processed using a method according to the invention for the same data used to generate the section in FIG. 2.

Example results comparing the output of a process according to the invention and pre-stack depth migration techniques known in the art will be explained with reference to FIGS. 2 and 3. FIG. 2 shows seismic data used to produce an image section using a pre-stack depth migration process known in the art. FIG. 3 shows a seismic image section generated using the same seismic data, and using the method according to the invention. As can be seen by comparing FIGS. 2 and 3, the image quality of the process of the invention is substantially the same as using pre-stack depth migration techniques known in the art.

Figure 4:
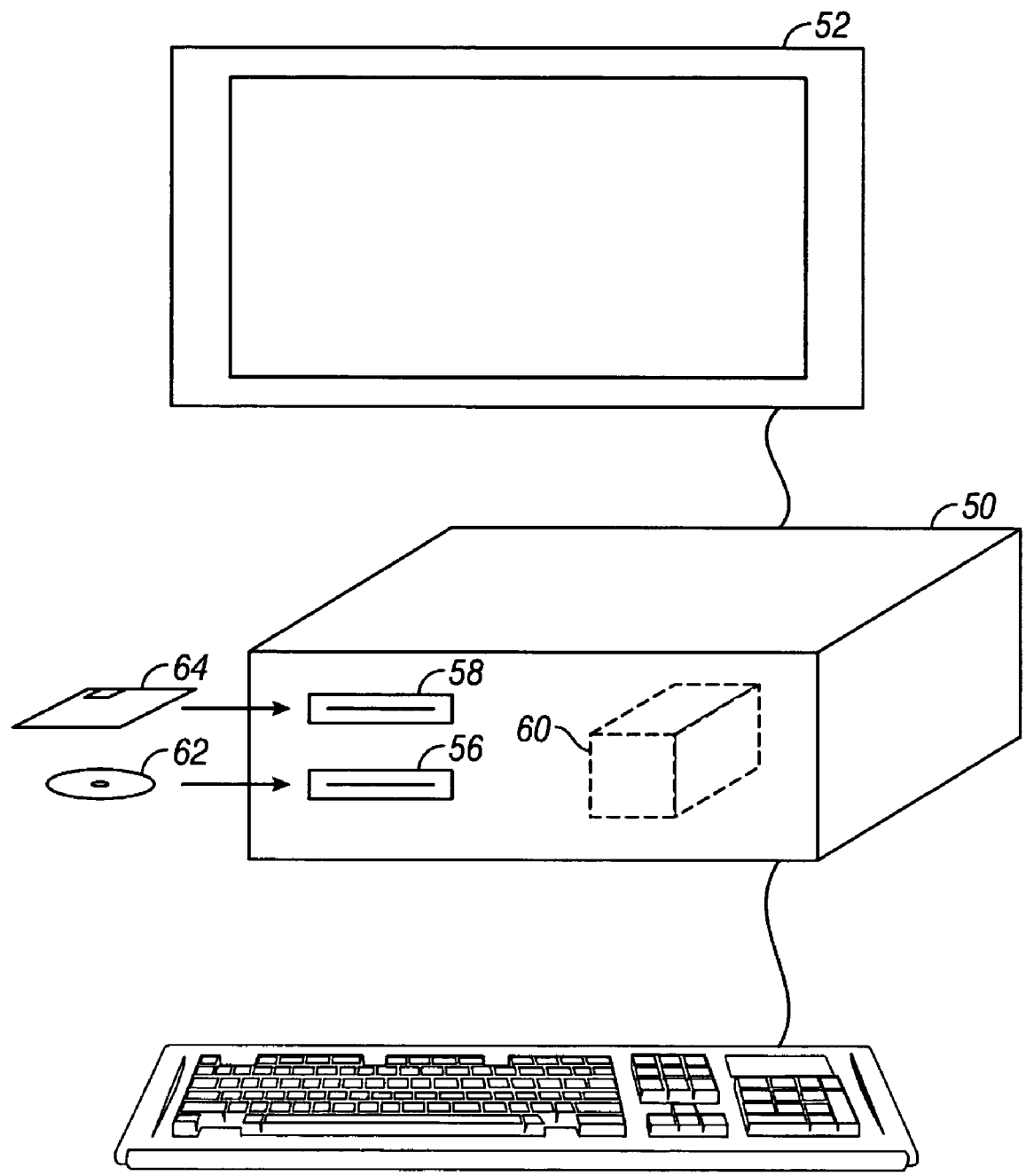
FIG. 4 shows a programmable computer and various computer readable media in which a computer program according to the invention may be stored.

In another aspect, the invention relates to computer programs stored in computer readable media. Referring to FIG. 4, the foregoing process as explained with reference to FIG. 1, can be embodied in computer-readable code. The code can be stored on a computer readable medium, such as floppy disk 68, CD-ROM 70 or a magnetic (or other type) hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute acts as set forth above and explained with respect to FIG. 1.

Methods according to the invention can provide depth migrated seismic data in a faster, more computationally economical manner than conventional pre-stack depth migration, while maintaining most of the improved image quality of pre-stack depth migration. Further, methods according to the invention can provide depth and/or time migrated images that take account of the effects of VTI media. Still further, methods according to the invention can provide depth migrated images that substantially preserve image amplitudes by accounting for ray bending.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for depth migrating seismic data, comprising:
pre-stack time migrating the seismic data to form a stacked, time migrated image, the time migration including estimating travel time to an image point as a polynomial expansion of source to image point surface distance with respect to travel time, the travel time estimating including adjustment for velocity variation in vertically transversely isotropic media;
Kirchhoff-integral time demigrating the stacked, time migrated image, the demigrating including estimating travel time from an image point to a source position as a polynomial expansion of travel time with respect to source to image point surface distance;
depth migrating the demigrated image and
at least one of storing and displaying the depth migrated image.

2. The method of claim 1 wherein the demigrating comprises calculating a weighting function, the weighting function taking into account in plane and out of plane geometric spreading.

* * * * *